(12) United States Patent
Duffy

(10) Patent No.: US 11,680,494 B2
(45) Date of Patent: Jun. 20, 2023

(54) VANE ARM TORQUE TRANSFER PLATE

(71) Applicant: United Technologies Corporation, Farmington, CT (US)

(72) Inventor: Christopher F. Duffy, Bolton, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 34 days.

(21) Appl. No.: 16/790,905

(22) Filed: Feb. 14, 2020

(65) Prior Publication Data

US 2021/0254494 A1 Aug. 19, 2021

(51) Int. Cl.
*F01D 17/16* (2006.01)
*F04D 29/56* (2006.01)
*F01D 9/04* (2006.01)

(52) U.S. Cl.
CPC ......... *F01D 17/162* (2013.01); *F04D 29/563* (2013.01); *F01D 9/042* (2013.01); *F05D 2220/323* (2013.01); *F05D 2230/60* (2013.01); *F05D 2240/12* (2013.01); *F05D 2260/50* (2013.01); *F05D 2260/79* (2013.01)

(58) Field of Classification Search
CPC ...... F01D 17/162; F01D 9/042; F04D 29/563; F05D 2260/79; F05D 2220/323; F05D 2230/60; F05D 2240/12; F05D 2260/50
See application file for complete search history.

(56) References Cited

U.S. PATENT DOCUMENTS

| | | | | |
|---|---|---|---|---|
| 4,363,600 A | * | 12/1982 | Thebert | F01D 17/162 |
| | | | | 415/140 |
| 4,652,208 A | * | 3/1987 | Tameo | F01D 5/146 |
| | | | | 415/148 |
| 6,799,945 B2 | * | 10/2004 | Chatel | F01D 17/162 |
| | | | | 415/156 |
| 7,182,571 B2 | * | 2/2007 | Selby | F01D 17/162 |
| | | | | 403/154 |
| 10,208,618 B2 | | 2/2019 | Gasmen et al. | |
| 2010/0092278 A1 | | 4/2010 | Major et al. | |
| 2014/0219785 A1 | | 8/2014 | Gasmen et al. | |
| 2021/0079806 A1 | * | 3/2021 | Little | F01D 17/162 |
| 2021/0140331 A1 | * | 5/2021 | Little | F01D 9/041 |

FOREIGN PATENT DOCUMENTS

FR 2877059 A1 4/2006
WO 2014158455 A1 10/2014

OTHER PUBLICATIONS

European search report for patent application No. 21 15 6923 dated Jul. 5, 2021.

* cited by examiner

*Primary Examiner* — Christopher Verdier
*Assistant Examiner* — Jesse M Prager
(74) *Attorney, Agent, or Firm* — Bachman & LaPointe, P.C.

(57) ABSTRACT

A vane arm connection system for a gas turbine engine includes a vane stem having a head with flat contact surfaces; a vane arm having a claw, the claw having opposed arms having inwardly facing surfaces engaging the flat contact surfaces of the head; and a torque transfer member having a body defining an opening for engaging the flat contact surfaces of the head of the vane stem, and at least one arm extending from the body to contact the claw, whereby load from torque is transferred away from the inwardly facing surfaces.

15 Claims, 7 Drawing Sheets

VANE ARM TORQUE TRANSFER PLATE

BACKGROUND OF THE DISCLOSURE

The present disclosure relates to gas turbine engines and, more particularly, to vane arm connection systems for gas turbine engines.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

Some gas turbine engines include variable stator vanes that can be pivoted about their individual axes to change an operational performance characteristic of the engine. Typically, the variable stator vanes are robustly designed to handle the stress loads that are applied to change the position of the vanes. A mechanical linkage is typically utilized to rotate the variable stator vanes. Because forces on the variable stator vanes can be relatively significant, forces transmitted through the mechanical linkage can also be relatively significant. Variable vanes are mounted about a pivot and are attached to an arm that is in turn actuated to adjust each of the vanes of a stage. A specific orientation between the arm and vane is required to assure that each vane in a stage is adjusted as desired to provide the desired engine operation. Newer compressor designs have resulted in higher compression ratios and loads. Further, recent designs have more vanes distributed through roughly the same space, resulting in decreased size, especially decreased diameter, of the vane stems. The point of connection of vane arms to vane stems is also subjected to even larger forces, especially torques, during surge load operation.

Sheet metal design of vane arms are used in legacy engines and are low cost but are limited in terms of grip strength to the vane stem. Current and future compressors tend to be of higher pressure ratio, generating higher loads which are limiting to the sheet metal design of a vane arm. Connection of a vane arm to a vane stem is typically made with a claw having arms which contact flat surfaces of the vane stem. However, with such a structure, as loads increase, force is applied to arms of the claw which can tend to pry open the claw.

SUMMARY OF THE DISCLOSURE

In one aspect of the present disclosure, a vane arm connection system for a gas turbine engine, comprises a vane stem having a head with flat contact surfaces; a vane arm having a claw, the claw comprising opposed arms having inwardly facing surfaces engaging the flat contact surfaces of the head; and a torque transfer member having a body defining an opening for engaging the flat contact surfaces of the head of the vane stem, and at least one arm extending from the body to contact the claw, whereby load from torque is transferred away from the inwardly facing surfaces.

In another non-limiting configuration, the torque transfer member comprises a plate having the body and the opening, and two arms extending from an edge of the body and defining claw contact surfaces.

In still another non-limiting configuration, the body has two spaced surfaces at least partially defining the opening, and the at least two spaced surfaces engage flat contact surfaces of the head of the vane stem.

In a further non-limiting configuration, the body further comprises an end surface closing the opening at an end opposite to the two arms, whereby the end surface holds the body in place against movement off of the flat contact surfaces of the head of the vane stem.

In a still further non-limiting configuration, the at least one arm engages the claw at a location other than the inwardly facing surfaces of the claw.

In yet another non-limiting configuration, the opposed arms of the claw have proximal and distal surfaces, and the at least one arm extends from the torque transfer member to contact at least one of the proximal and distal surfaces.

In another non-limiting configuration, the claw has an upper body defining an opening for securing to the vane stem and two claw arms extending downwardly from the upper body and engaging the flat contact surfaces of the head, the torque transfer member is positioned below the upper body of the claw, and within the claw arms, and the at least one arm extends outside of the claw arms to contact the at least one of the proximal and distal surfaces.

In still another non-limiting configuration, the two arms extend away from each other to contact at least one of the proximal and distal surfaces of both of the claw arms.

In a further non-limiting configuration, contact between the at least one arm and the claw is along a line that is perpendicular to contact between the opening and the flat contact surfaces of the head.

In a still further non-limiting configuration, the torque transfer member has a distal end when mounted to the vane stem, and further comprises a cutout for receiving an anti-rotation tab to prevent rotation during assembly.

In yet another non-limiting configuration, the torque transfer member comprises two arms extending laterally in opposite directions from one edge of the body, and the cutout is between the two arms.

In another non-limiting configuration, the body has a width sized to fit between the opposed arms of the claw, and the at least one arm extends laterally beyond the width of the body.

In still another non-limiting configuration, the at least one arm comprises two arms extending laterally in opposite directions beyond the width of the body.

In a further non-limiting configuration, the body and the at least one arm of the torque transfer member comprise a single piece part of stamped sheet metal.

In a still further non-limiting configuration, a torque transfer member for a vane arm connection comprises a body having an opening with spaced flat sides for engaging flat contact surfaces of a head of a vane stem, and at least one arm extending laterally from an edge of the body to engage a surface of a claw of a vane arm engaged with the vane stem.

In yet another non-limiting configuration, the body and the at least one arm comprise a single piece part of stamped sheet metal.

In another non-limiting configuration, the body has a width sized to fit between opposed arms of the claw, and the at least one arm extends laterally beyond the width of the body.

In a further non-limiting configuration, a method for retrofitting a vane arm having a claw to a vane stem having a head with flat contact surfaces, wherein the claw comprises claw arms for engaging the flat contact surfaces of the head, comprises the step of positioning a torque transfer member on the vane stem, the torque transfer member having an opening engaging the flat contact surfaces of the head, and at least one arm extending to engage the claw, wherein the positioning step positions the at least one arm to engage the claw when the vane stem is subjected to a torque relative to the vane arm.

In a still further non-limiting configuration, the method comprises positioning the torque transfer member within the claw arms, and mounting the torque transfer member and the claw together to the vane stem whereby the opening of the torque transfer member and the claw arms engage the flat contact surfaces of the head, and the at least one arm engages a surface of the claw.

In yet another non-limiting configuration, the claw arms engage the flat contact surfaces of the head at opposed surfaces, and the surface engaged by the at least one arm is not the opposed surfaces.

BRIEF DESCRIPTION OF THE DRAWINGS

A detailed description of non-limiting embodiments of the disclosure follows, with reference to the attached drawings, wherein.

DETAILED DESCRIPTION

Figure 1:
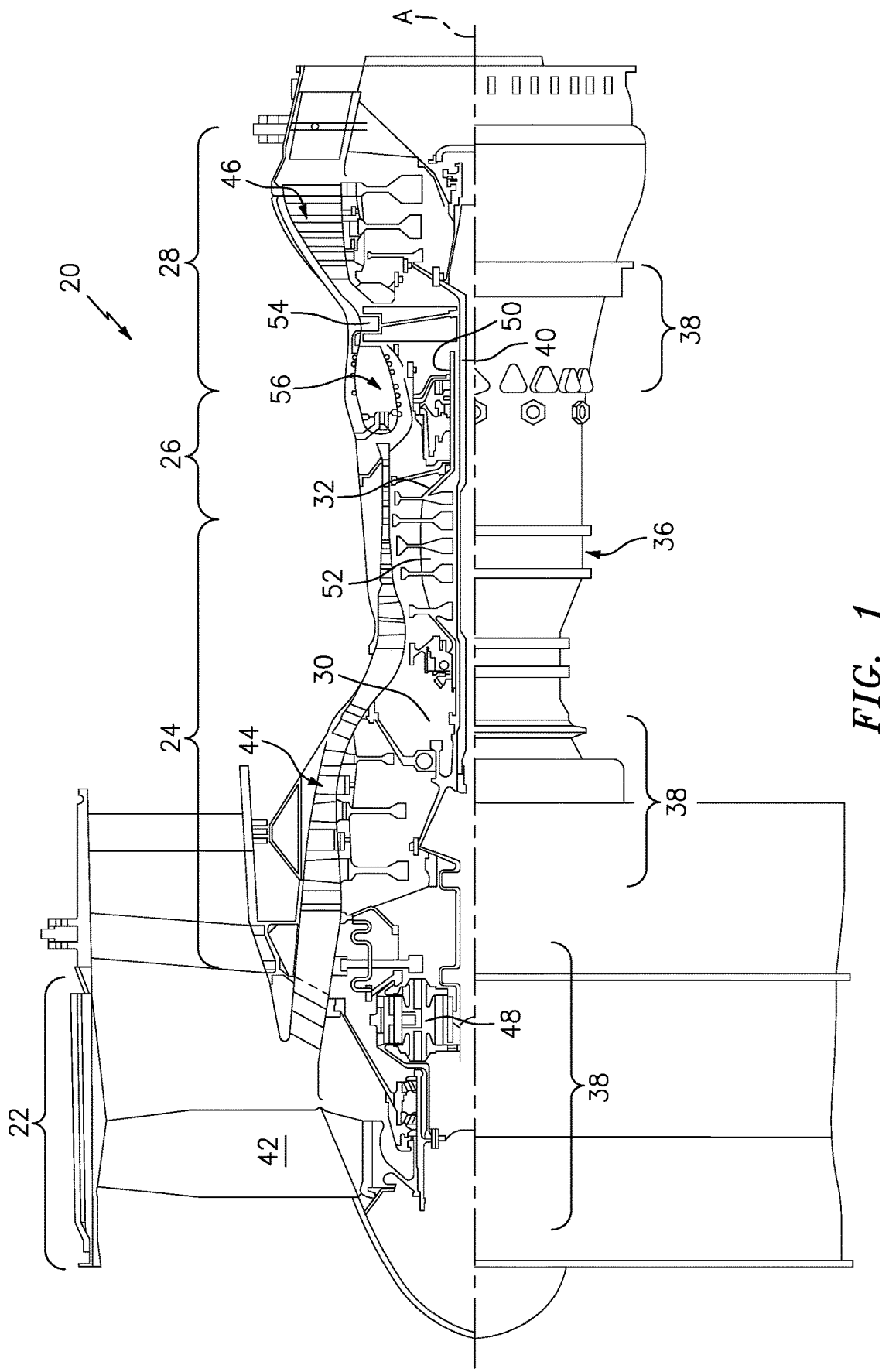
FIG. 1 is a schematic cross-section of a non-limiting example of a gas turbine engine architecture.

FIG. 1 schematically illustrates a gas turbine engine 20. The gas turbine engine 20 is disclosed herein as a two-spool geared turbofan (GTF) that generally incorporates a fan section 22, a compressor section 24, a combustor section 26 and a turbine section 28. Alternative engine architectures might include various other sections, systems or features which are not illustrated herein. The fan section 22 drives air along a bypass flowpath while the compressor section 24 drives air along a core flowpath for compression and communication into the combustor section 26, and then expansion through the turbine section 28. Although depicted as a GTF in the disclosed non-limiting embodiment, it should be understood that the concepts described herein are not limited to use with a GTF as the teachings may be applied to other types of turbine engines such as a direct drive turbofan with high or low bypass turbofan, turbojets, turboshafts, and three spool (plus fan) turbofans wherein an intermediate spool includes an intermediate pressure compressor (IPC) between a low pressure compressor (LPC) and a high pressure compressor (HPC), and an intermediate pressure turbine (IPT) between the high pressure turbine (HPT) and the low pressure turbine (LPT).

The engine 20 generally includes a low spool 30 and a high spool 32 mounted for rotation about an engine central longitudinal axis A relative to an engine static structure 36 via several bearing compartments 38. The low spool 30 generally includes an inner shaft 40 that interconnects a fan 42, a low pressure compressor 44 (LPC) and a low pressure turbine 46 (LPT). The inner shaft 40 drives the fan 42 directly or thru a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor 52 (HPC) and high pressure turbine 54 (HPT). A combustor 56 is arranged between the HPC 52 and the HPT 54. The inner shaft 40 and the outer shaft 50 are concentric and rotate about the engine central longitudinal axis A which is collinear with their longitudinal axes.

Core airflow is compressed by the LPC 44 then the HPC 52, mixed with fuel and burned in the combustor 56, then expanded over the HPT 54 and the LPT 46. The turbines 54, 46 rotationally drive the respective low spool 30 and high spool 32 in response to the expansion. The main engine shafts 40, 50 are supported at a plurality of points by the bearing compartments 38. It should be understood that various bearing compartments 38 at various locations may alternatively or additionally be provided.

In one example, the gas turbine engine 20 is a high-bypass geared aircraft engine with a bypass ratio greater than about six (6:1). The geared architecture 48 can include an epicyclic gear train, such as a planetary gear system or other gear system. The example epicyclic gear train has a gear reduction ratio of greater than about 2.3:1, and in another example is greater than about 3.0:1. The geared turbofan enables operation of the low spool 30 at higher speeds which can increase the operational efficiency of the LPC 44 and LPT 46 to render increased pressure in relatively few stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be understood, however, that the above parameters are only exemplary of one embodiment of a geared architecture engine and that the present disclosure is applicable to other gas turbine engines including direct drive turbofans, where the rotational speed of the fan 42 is the same (1:1) of the LPC 44.

In one example, a significant amount of thrust is provided by the bypass flow path due to the high bypass ratio. The fan section 22 of the gas turbine engine 20 is designed for a particular flight condition—typically cruise at about 0.8 Mach and about 35,000 feet (10668 meters). This flight condition, with the gas turbine engine 20 at its best fuel consumption, is also known as bucket cruise thrust specific fuel consumption (TSFC). TSFC is an industry standard parameter of fuel consumption per unit of thrust.

Fan pressure ratio is the pressure ratio across a blade of the fan section 22 without the use of a fan exit guide vane system. The relatively low fan pressure ratio according to one example of a gas turbine engine 20 is less than 1.45. Low corrected fan tip speed is the actual fan tip speed divided by an industry standard temperature correction of ("T"/518.7)0.5 in which "T" represents the ambient temperature in degrees Rankine. The low corrected fan tip speed according to one example of a gas turbine engine 20 is less than about 1150 fps (351 m/s).

Figure 2:
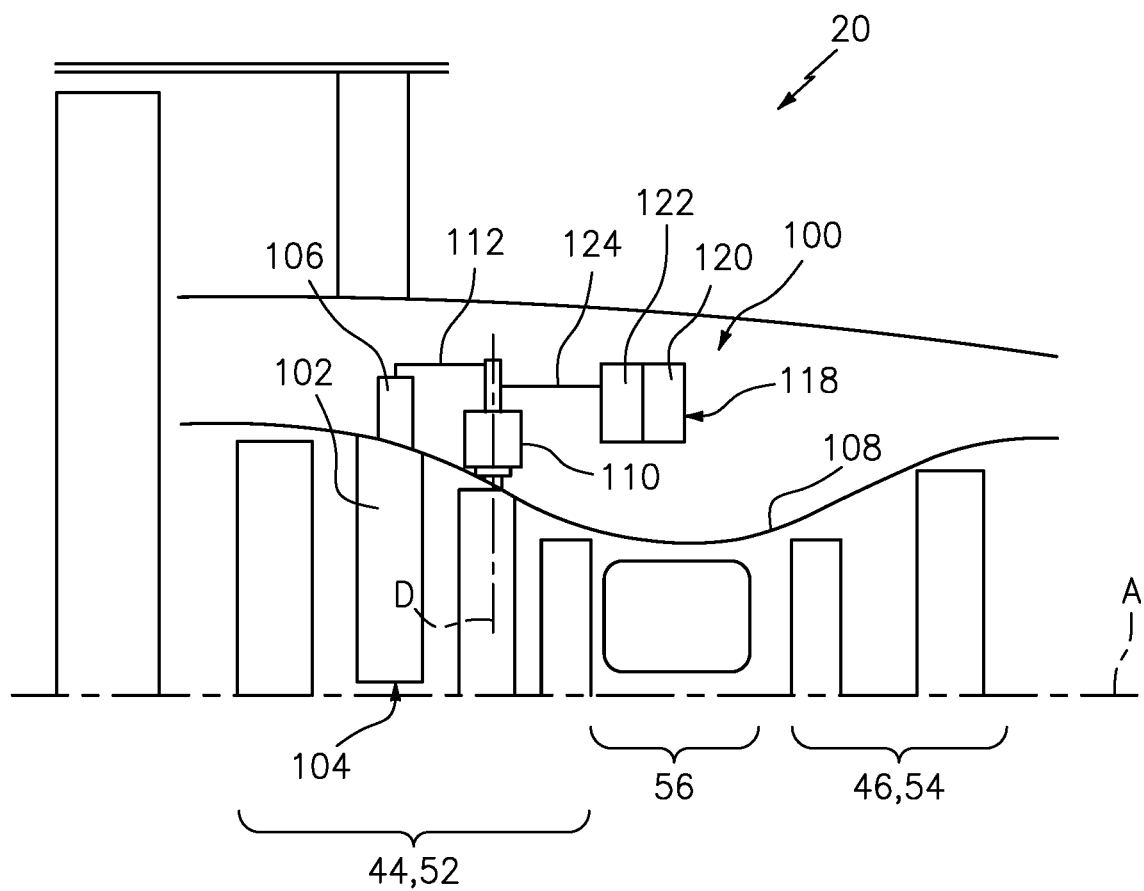
FIG. 2 is a schematic view of a variable vane system for a gas turbine engine.

With reference to FIG. 2, one or more stages of the LPC 44 and/or the HPC 52 include a variable vane system 100 that can be rotated to change an operational performance characteristic of the gas turbine engine 20 for different operating conditions. The variable vane system 100 may include one or more variable vane stages.

Figure 3:
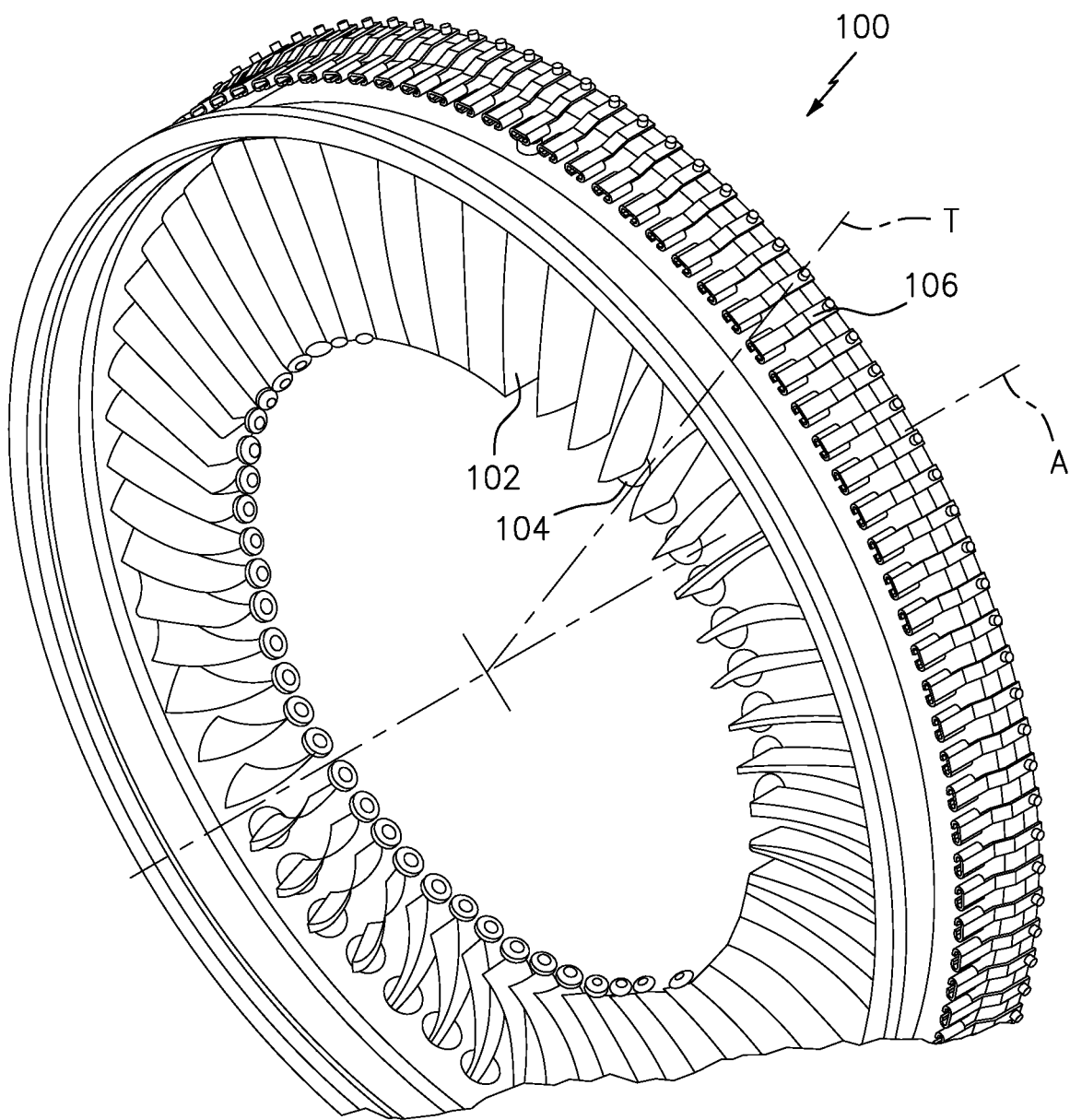
FIG. 3 is a partial perspective view of one stage of a variable vane system for a gas turbine engine.

The variable vane system 100 may include a plurality of variable stator vanes 102 (see also FIG. 3) circumferentially arranged around the engine central axis A. The variable stator vanes 102 each include a variable vane body that has an airfoil portion such that one side of the airfoil portion generally operates as a suction side and the opposing side of the airfoil portion generally operates as a pressure side. Each of the variable stator vanes 102 generally spans between an inner diameter and an outer diameter relative to the engine central axis A.

Figure 4:
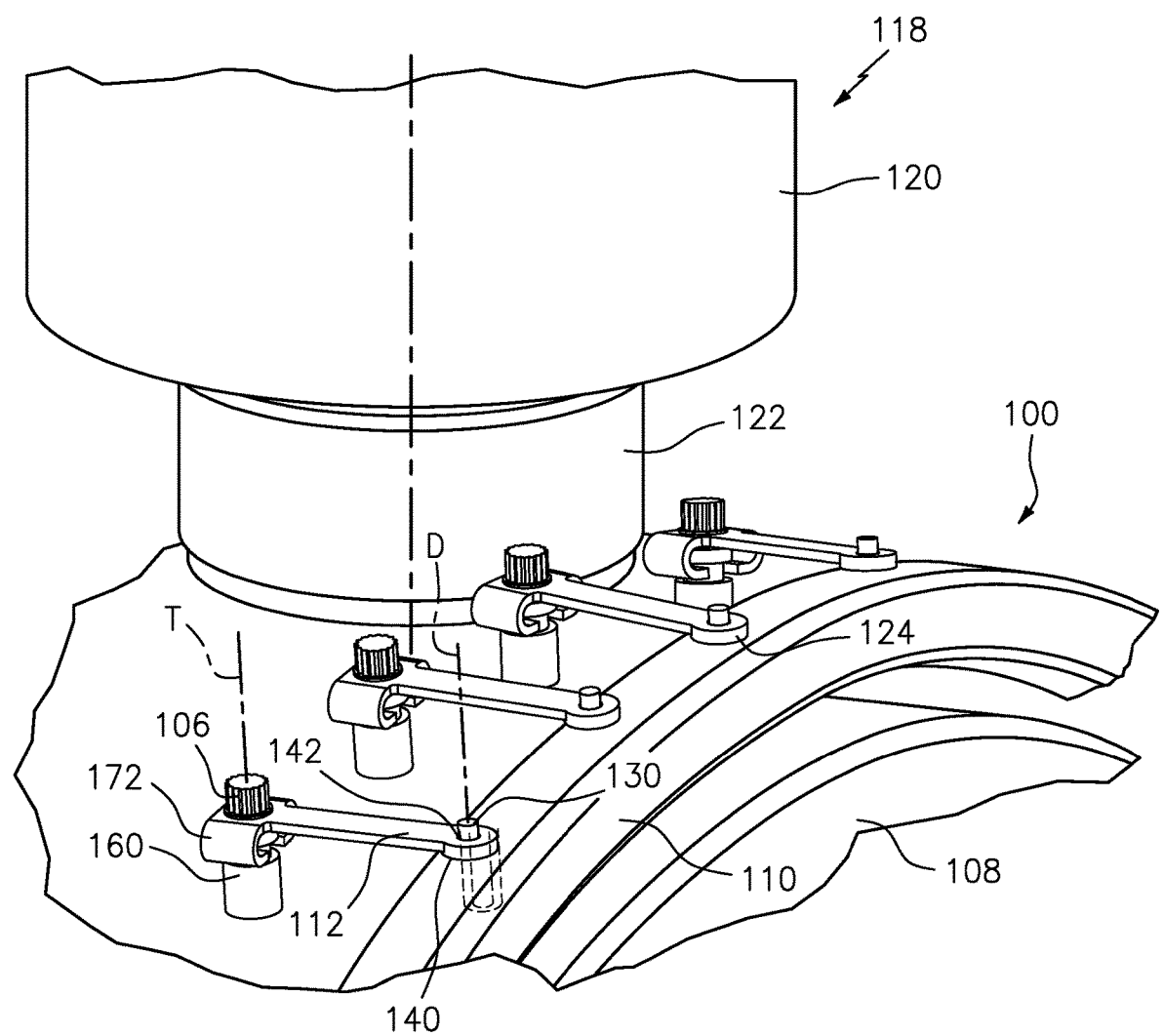
FIG. 4 is a partial perspective view of a variable vane system for a gas turbine engine according to one disclosed non-limiting embodiment.

Each of the variable stator vanes 102 includes an inner trunnion 104 that is receivable into a corresponding socket and an outer trunnion 106 mounted through an outer engine case 108 such that each of the variable stator vanes 102 can pivot about a vane axis T (shown in FIG. 4).

The variable vane system 100 further includes a synchronizing ring assembly 110 to which, in one disclosed non-limiting embodiment, each of the outer trunnions 106 are attached through a vane arm 112 connected to ring assembly 110 for example with a fastener extending along a respective axis D. It should be appreciated that although a particular vane arm 112 is disclosed in this embodiment, various linkages of various geometries may be utilized.

The variable vane system 100 is driven by an actuator system 118 with an actuator 120, a drive 122 and an actuator arm 124 (also shown in FIG. 4). Although particular components are separately described, it should be appreciated that alternative or additional components may be provided.

With reference to FIG. 4, the vane arm 112 links each outer trunnion 106 to the synchronizing ring assembly 110. Rotation of the synchronizing ring assembly 110 about the engine axis A (FIG. 1) drives the vane arm 112 to rotate the outer trunnion 106 of each of the variable stator vanes 102.

Each vane arm 112 interfaces with the synchronizing ring assembly 110 via a pin 130. The pin 130 is swaged to an end section 140 of the vane arm 112 within an aperture 142. Of course, other connections between vane arm 112 and ring 110 could be utilized.

FIG. 4 shows that vane arms 112 engage with vane stems 160. This point of engaging is subject to potentially significant torque during operation of the engine and also the system to position the vanes as desired. Under surge loads, this torque is increased even further.

Figure 5A:
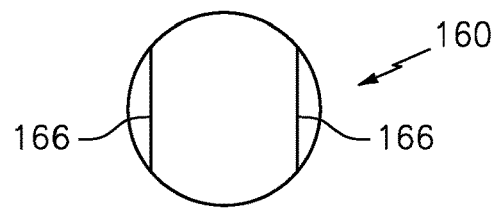
FIGS. 5A-5C illustrate a known vane arm connection to a vane stem.
Figure 5B:
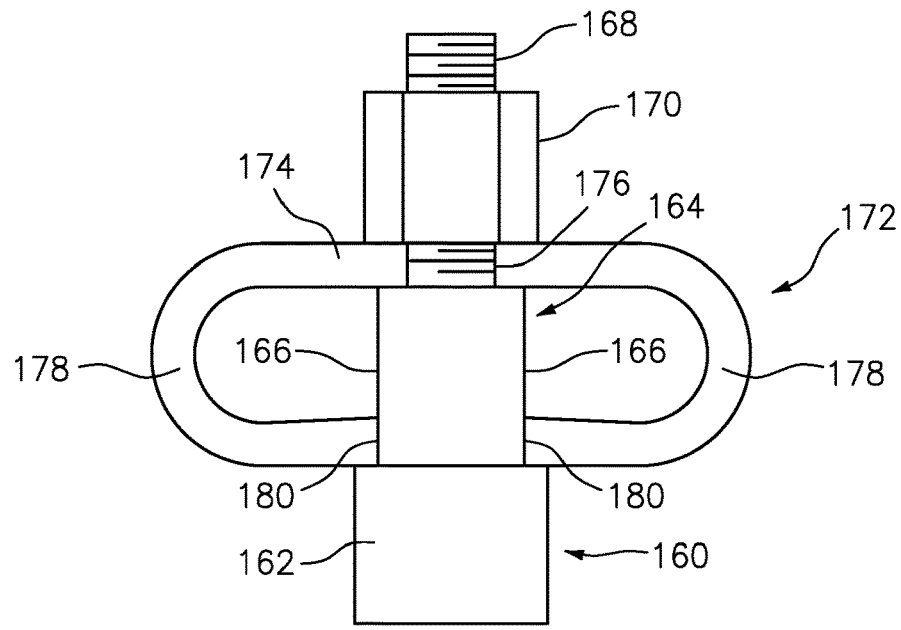
Figure 5C:
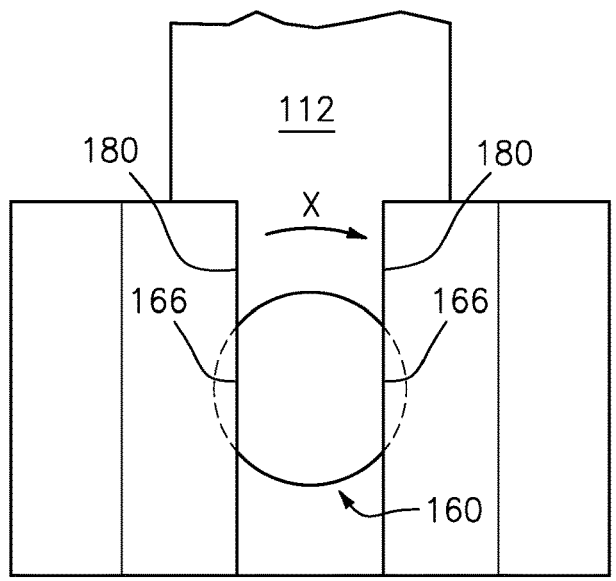

FIGS. 5A-C illustrate engagement of a known vane arm and claw structure with a vane stem. As shown, vane stem 160 can have a base 162 which extends to other systems of the engine, for example to vanes which are to be positioned around axis T as discussed above. Extending from base 162 is a head 164 which defines two oppositely facing flat contact surfaces 166. A typical vane stem 160 then also has a round portion 168 extending upwardly from the head 164, and the vane arm can be secured to the vane stem with a nut 170 which can, for example, be threaded to the round portion 168. Alternatively, this connection can be by way of a threaded opening in the vane stem, and a bolt threaded into the opening. This type of connection is illustrated in FIGS. 7 and 8 discussed below.

Also as illustrated, a vane arm typically has a claw structure 172 (see also FIG. 4) to securely engage the vane stem. Claw structure 172 has a central portion 174 which has an opening 176 for receiving round portion 168 of vane stem 160. Claw arms 178 extend from central portion 174 and typically curve downwardly to define spaced, inwardly directed surfaces 180 which engage with flat contact surfaces 166 of head 164. In this way, claw structure 172 is engaged with vane stem 160. As set forth above, however, current and planned designs of gas turbine engines involve use of more vanes and therefor more vane stems, which results in the need for smaller diameter vane stems. This, in turn, results in smaller flat contact surfaces 166 to be engaged by inwardly directed surfaces 180, and therefore an increased chance that inwardly directed surfaces 180 will deflect or spread relative to flat surfaces 166, particularly under surge load conditions wherein the torque (see arrow X, FIG. 5C) is significantly increased.

Figure 6:
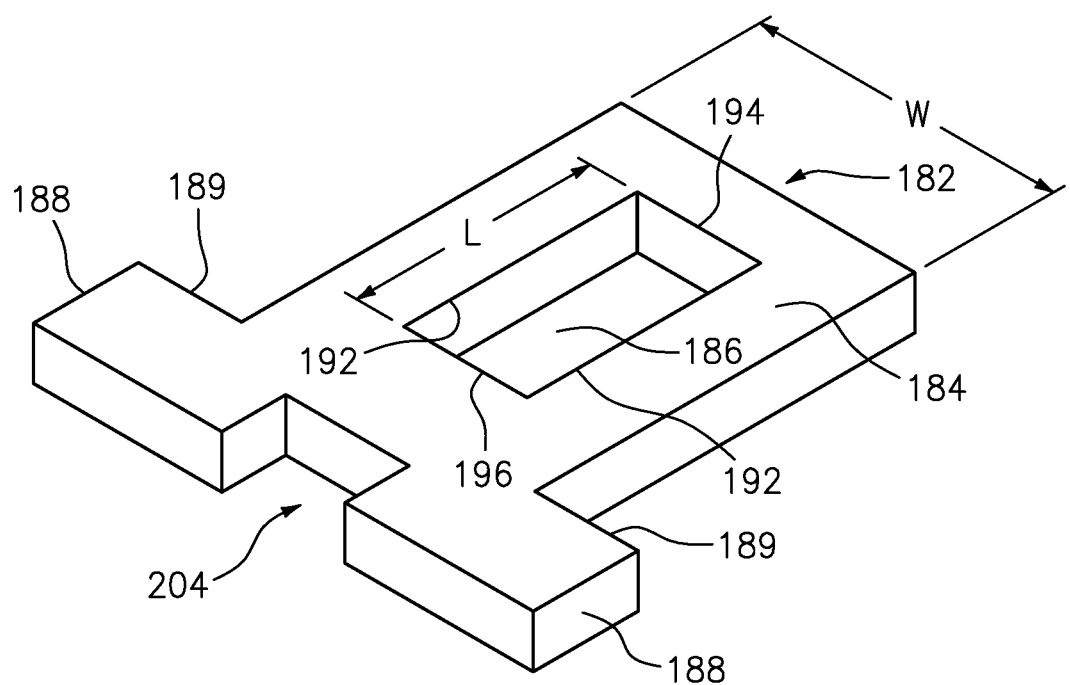
FIG. 6 shows a non-limiting embodiment of a torque transfer plate according to the disclosure.

Referring to FIG. 6, a torque transfer member or plate 182 is illustrated. Torque transfer plate 182 in this configuration is a substantially flat member having a body portion 184 defining an opening 186, and having at least one arm 188, in this configuration two arms 188, that serve to contact a claw of a vane arm and transfer some of the force due to torque that would otherwise tend to pry open the claw arms. Force is transferred to a different part of the claw where there is significantly more stiffness, such that connection of vane arm 112 to vane stem 160 is more able to withstand surge loads without prying open the claw. Thus, torque capacity before yield is increased.

Figure 7:
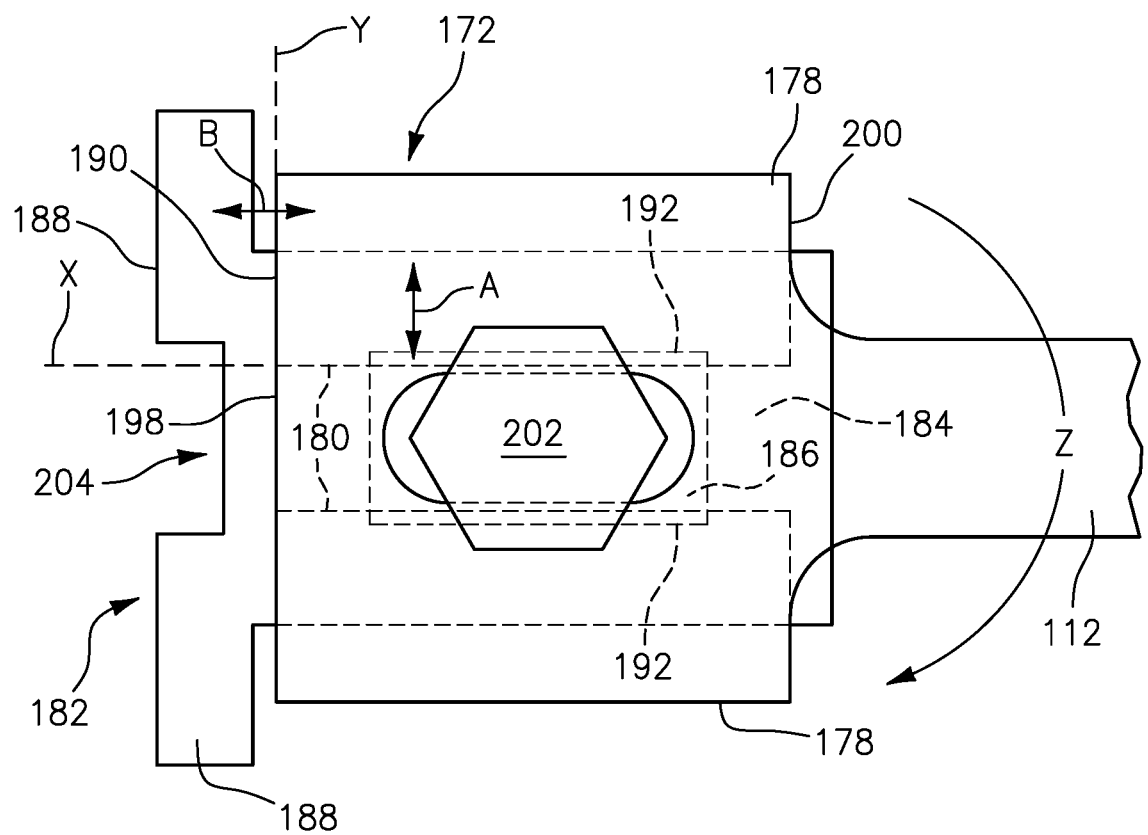
FIG. 7 is a top view showing mounting of the torque transfer plate of FIG. 6 between a vane arm and a vane stem.
Figure 8:
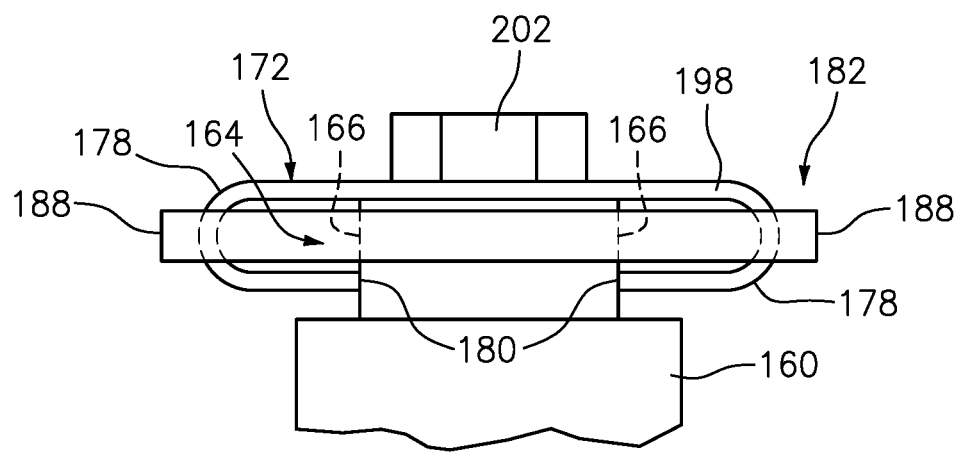
FIG. 8 shows an end view, partially in section, of the torque transfer plate of FIG. 6 mounted between a vane arm and a vane stem.

FIGS. 7 and 8 illustrate a torque transfer plate 182 in position in a vane arm connection system, mounted to a vane stem 160 within a claw 172 of a vane arm 112. As shown, opening 186 engages flat contact surfaces 166 of head 164 such that torque transfer plate 182 is non-rotatably mounted to the vane stem 160. In addition, arms 188 extend outside of claw 172 and engage with a surface of claw 172 that is not the opposing surfaces 180, such that the engagement of torque transfer plate 182 with claw 172 does not create forces that tend to pry the claw arms open. Rather, force is transferred from where it would normally occur, illustrated by arrow A in FIG. 7, to engage on an edge surface 190 of claw 172 where the claw can accept the force in a direction indicated by arrow B in FIG. 7, without being pried open. In the configuration illustrated, the force is transferred 90 degrees around claw 172.

Referring back to FIG. 6, further details of this configuration of torque transfer plate 182 are discussed. In this non-limiting configuration, body 184 has a width W sized to fit between claw arms 178 of claw 172 (illustrated in FIG. 8 discussed below). Within the body 184, opening 186 is defined having two spaced surfaces 192 which can be spaced to engage with flat contact surfaces 166 of head 164. This can be a press fit, or a fit designed to be snug with little or no lateral play.

Opening 186 also has a length L which is configured to accept the flat contact surfaces 166 of head 164 as best shown in FIG. 7. This length dimension can be snug or can have some play. In addition, it should be noted that other configurations of this portion of the opening are possible, for example where only one end surface 194 of the opening that is opposite to arms 188 is utilized, and the other end of the opening can be open. End surface 194 serves to hold torque transfer plate 182 in place when mounted within a claw 172 on head 164. End surface 194 prevents plate 182 from sliding out in the direction toward arms 188, while arms 188 engage against claw 172 and prevent plate 182 from sliding out in the other direction. Thus, the portion of body 184 indicated at 196 could alternatively be open, for example to save material and weight.

FIG. 6 illustrates plate 182 formed from stamped sheet metal such that body 184 and arms 188 are a single integral piece part. While this is beneficial from a simplicity and ease of manufacturing standpoint, other configurations are possible. For example, plate 182 could be made from composite or sintered metal, and could be additively manufactured, or machined instead of stamped from sheet metal, or could generally be fabricated by any known method. However, sheet metal stamping is one particularly cost-effective method for high volume production.

FIG. 7 shows a top view of plate 182 mounted within claw 172 on head 164 of vane stem 160. As shown, body 184 is sized to fit within arms 178 of claw 172. Arms 188 extend outside of claw 172 to a dimension wider than the space between arms 178 and, in this non-limiting configuration, engage against a distal edge surface 198 of claw 172. As set forth above, this serves to transfer force of engagement between flat contact surfaces 166 of head 164 and claw 172 from a prying force applied to inner surfaces 180 of arms 178, through plate 182 to distal edge surface 198 where the force is not structurally detrimental to the claw. As shown, engagement of contact surfaces 166 of head 164 with both claw 172 and plate 182 is along flat surfaces in one plane X, but engagement between plate 182 and claw 172 is along flat surfaces in another plane Y that is turned approximately 90 degrees, or is substantially perpendicular, to plane X. Thus, force due to a torque load as illustrated by arrow Z can be at least partially transferred from plane X to plane Y, where it will not tend to pry open claw arms 178.

It should be appreciated that although plate 182 is shown in FIG. 7 with arms 188 engaging distal edge surface 198 of claw 172, in some configurations (not illustrated), plate 182 could be assembled in the reverse position such that arms 188 engage against a proximal edge surface 200 of claw 172, with substantially the same result. In either position, arms 188 have claw contact surfaces 189 that contact either distal edge surface 198 or proximal edge surface 200 of claw 172. Also, while FIGS. 6-8 illustrate one non-limiting configuration wherein arms 188 engage distal or proximal edge surfaces of the claw, other configurations are possible, with arms 188 engaging against other portions of claw 172, so long as the contact is not with opposed surfaces 180 or otherwise within arms 178 and outwardly directed so as to pry arms 178 apart.

Arms 188 extend at least as wide as arms 178 so that the transferred force can be transferred to as much area as possible, thereby also potentially reducing localized stress caused by such force, in addition to transferring such force away from plane X.

In FIG. 5B, a configuration of vane stem is shown wherein a threaded portion 168 is mounted to the vane stem, and a nut 170 is threaded onto this threaded portion to complete assembly. FIGS. 7 and 8 illustrate an alternative configuration wherein a bolt 202 is threaded into a threaded opening (not illustrated) of the vane stem. Either of these configurations serves to secure claw 172 and plate 182 in place on head 164.

Referring back to FIGS. 6 and 7, plate 182 can have a cutout 204 positioned between arms 188. Cutout 204 accepts an anti rotation tab of the claw and helps to hold all components in place during assembly. Cutout 204 also serves to conserve material and reduce weight.

It should be appreciated that both new and existing systems can benefit from plate 182 as disclosed herein. Retrofitting plate 182 to systems having only claw 172 mounted to head 164 is possible. Plate 182 can be implemented in such systems by positioning plate 182 within claw 172, with body 184 below the upper body of the claw and between the claw arms and arms 188 extending laterally outside of claw 172. Then opening 186 and arms 178 can be positioned on head 164 to engage flat contact surfaces 166 of head 164. Then these components can be secured in place with bolt 202 or nut 170 depending upon the configuration in use.

Surfaces of claw 172 have been referred to herein as distal and proximal, and these terms should be considered when viewed from the non-claw end of the vane arm. Thus, from the non-claw end of the vane arm, distal edge surface 198 would be the furthest away edge of claw 172, while proximal edge surface 200 would be the closer edge surface of claw 172.

The foregoing description should be considered as an exempla of a structure of the disclosed torque transfer plate, and the features disclosed herein should be seen as illustrative but not limiting upon the disclosure. Various non-limiting embodiments are disclosed. However, one of ordinary skill in the art would recognize that various modifications and variations in light of the above teachings will fall within the scope of the appended claims. It is therefore to be understood that within the scope of the appended claims, the disclosure may be practiced other than as specifically described.

The invention claimed is:

1. A vane arm connection system for a gas turbine engine, comprising:
   a vane stem having a head with flat contact surfaces;
   a vane arm having a claw, the claw comprising opposed arms having inwardly facing surfaces engaging the flat contact surfaces of the head and wherein the opposed arms of the claw collectively comprise a proximal surface facing toward the vane arm and a distal surface facing away from the vane arm which are transverse to the inwardly facing surfaces; and
   a torque transfer member having a body defining an opening for engaging the flat contact surfaces of the head of the vane stem, and at least one arm extending from the body to contact the claw at at least one of the proximal surface and the distal surface, whereby load from torque is transferred away from the inwardly facing surfaces, wherein the claw has an upper body defining an opening for securing to the vane stem and the opposed arms extending downwardly from the upper body and engaging the flat contact surfaces of the head, wherein the torque transfer member is positioned below the upper body of the claw, and within the opposed arms, and wherein the at least one arm extends outside the opposed arms to contact the at least one of the proximal surface and the distal surface.

2. The system of claim 1, wherein the torque transfer member comprises a plate having the body and the opening, and wherein the at least one arm comprises two torque transfer arms extending from an edge of the body and defining at least two claw contact surfaces.

3. The system of claim 2, wherein the body has two spaced surfaces partially defining the opening, and wherein the at least two spaced surfaces engage the flat contact surfaces of the head of the vane stem.

4. The system of claim 3, wherein the body further comprises an end surface closing the opening at an end opposite to the two torque transfer arms, whereby the end surface holds the body in place against movement off of the flat contact surfaces of the head of the vane stem.

5. The system of claim 1, wherein the at least one arm comprises two torque transfer arms which extend away from each other to contact at least one of the proximal surface and the distal surface of both of the claw arms.

6. The system of claim 1, wherein contact between the at least one arm and the claw is along a line that is perpendicular to contact between the opening and the flat contact surfaces of the head.

7. The system of claim 1, wherein the torque transfer member has a distal end when mounted to the vane stem, and further comprising a cutout for receiving an anti-rotation tab to prevent rotation during assembly.

8. The system of claim 7, wherein the at least one arm of the torque transfer member comprises two torque transfer arms extending laterally in opposite directions from one edge of the body, and wherein the cutout is between the two torque transfer arms.

9. The system of claim 1, wherein the body has a width sized to fit between the opposed arms of the claw, and wherein the at least one arm extends laterally beyond the width of the body.

10. The system of claim 9, wherein the at least one arm comprises two torque transfer arms extending laterally in opposite directions beyond the width of the body.

11. The system of claim 1, wherein the body and the at least one arm of the torque transfer member comprise a single piece part of stamped sheet metal.

12. A method for retrofitting a vane arm having a claw to a vane stem having a head with flat contact surfaces, wherein the claw comprises opposed arms having inwardly facing surfaces engaging the flat contact surfaces of the head and wherein the opposed arms of the claw collectively comprise a proximal surface facing toward the vane arm and a distal surface facing away from the vane arm which are transverse to the inwardly facing surfaces, comprising the step of positioning a torque transfer member on the vane stem, the torque transfer member having a body defining an opening for engaging the flat contact surfaces of the head of the vane stem, and at least one arm extending from the body to contact the claw at at least one of the proximal surface and the distal surface, whereby load from torque is transferred away from the inwardly facing surfaces, wherein the claw has an upper body defining an opening for securing to the vane stem and the opposed arms extending downwardly from the upper body and engaging the flat contact surfaces of the head, wherein the torque transfer member is positioned below the upper body of the claw, and within the opposed arms, and wherein the at least one arm extends outside the opposed arms to contact the at least one of the proximal surface and the distal surface, wherein the step of positioning the torque transfer member positions the at least one arm to engage the claw when the vane stem is subjected to a torque relative to the vane arm.

13. The method of claim 12, wherein the method comprises positioning the torque transfer member within the claw arms, and mounting the torque transfer member and the claw together to the vane stem whereby the opening of the torque transfer member and the claw arms engage the flat contact surfaces of the head, and the at least one arm engages a surface of the claw.

14. The method of claim 13, wherein the claw arms engage the flat contact surfaces of the head at opposed surfaces, and wherein the surface engaged by the at least one arm is not the opposed surfaces.

15. The system of claim 1, wherein the proximal surface is a proximal edge surface and the distal surface is a distal edge surface.

* * * * *